US012714032B2

(12) United States Patent
Song et al.

(10) Patent No.: US 12,714,032 B2
(45) Date of Patent: Aug. 25, 2026

(54) LIGHT DEVICE FOR PLANT CULTIVATION

(71) Applicant: SEOUL VIOSYS CO., LTD., Gyeonggi-do (KR)

(72) Inventors: Hyun Su Song, Gyeonggi-do (KR); Sang Min Ko, Gyeonggi-do (KR); Se Ryung Kim, Gyeonggi-do (KR); Jin Won Kim, Gyeonggi-do (KR)

(73) Assignee: Seoul Viosys Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/216,730

(22) Filed: Jun. 30, 2023

(65) Prior Publication Data

US 2023/0337591 A1 Oct. 26, 2023

Related U.S. Application Data

(63) Continuation of application No. 17/172,830, filed on Feb. 10, 2021, now Pat. No. 11,707,022.

(60) Provisional application No. 62/976,886, filed on Feb. 14, 2020.

(51) Int. Cl.
*A01G 7/04* (2006.01)

(52) U.S. Cl.
CPC .................................... *A01G 7/045* (2013.01)

(58) Field of Classification Search
CPC ...................................................... A01G 7/045
See application file for complete search history.

(56) References Cited

U.S. PATENT DOCUMENTS

| | | | | |
|---|---|---|---|---|
| 9,021,739 | B2 | 5/2015 | Koo et al. | |
| 9,820,447 | B2 * | 11/2017 | Vilgiate | H05B 45/20 |
| 9,872,357 | B1 * | 1/2018 | Aikala | H05B 47/19 |
| 10,842,082 | B1 * | 11/2020 | Genga, Jr. | A01G 9/249 |
| 11,274,817 | B2 * | 3/2022 | Wu | A01G 7/045 |
| 11,304,376 | B2 * | 4/2022 | McClear | A01G 9/20 |
| 2013/0258684 | A1 | 10/2013 | Yang et al. | |
| 2014/0215917 | A1 * | 8/2014 | Suzuki | A01H 3/02 362/221 |

(Continued)

FOREIGN PATENT DOCUMENTS

| | | | |
|---|---|---|---|
| CN | 105333328 | A | 2/2016 |
| EP | 1269830 | A1 | 1/2003 |

(Continued)

OTHER PUBLICATIONS

EP Application No. 21754196.0, Search report dated Feb. 22, 2024, 8 pages.

(Continued)

*Primary Examiner* — Joshua D Huson
*Assistant Examiner* — Katherine Anne Kloecker
(74) *Attorney, Agent, or Firm* — LaBatt, LLC

(57) ABSTRACT

A light device for plant cultivation is disclosed. The light device for plant cultivation includes a light source unit including multiple first light source modules and multiple second light source modules. The multiple first light source modules and the multiple second light source modules may emit light for plant cultivation toward a plant. The multiple first light source modules are arranged at constant intervals. The multiple second light source modules are disposed at least between a pair of first light source modules disposed at both ends of the light source unit.

20 Claims, 9 Drawing Sheets

(56) References Cited

U.S. PATENT DOCUMENTS

| | | | | |
|---|---|---|---|---|
| 2014/0376239 | A1 * | 12/2014 | Kim | F21V 21/14 362/418 |
| 2015/0351325 | A1 | 12/2015 | Shelor et al. | |
| 2016/0064204 | A1 | 3/2016 | Greenberg et al. | |
| 2016/0286747 | A1 * | 10/2016 | Matsumoto | A01G 31/02 |
| 2018/0087755 | A1 * | 3/2018 | Yorio | F21V 17/007 |
| 2018/0092308 | A1 | 4/2018 | Barber et al. | |
| 2019/0261574 | A1 * | 8/2019 | Tomasovics | F21V 23/0471 |
| 2020/0053856 | A1 * | 2/2020 | Barber | A01G 7/045 |
| 2020/0375118 | A1 * | 12/2020 | Lee | F21V 21/15 |

FOREIGN PATENT DOCUMENTS

| | | | | |
|---|---|---|---|---|
| EP | 2761995 | A1 * | 8/2014 | A01G 1/001 |
| JP | 2011244740 | A | 12/2011 | |
| JP | 2012170361 | A | 9/2012 | |
| JP | 2016507220 | A | 3/2016 | |
| JP | 2016086783 | A | 5/2016 | |
| JP | 2016150001 | A | 8/2016 | |
| JP | 2017506082 | A | 3/2017 | |
| JP | 2019068797 | A | 5/2019 | |
| JP | 2019162059 | A | 9/2019 | |
| KR | 101183666 | B1 | 9/2012 | |
| KR | 101268566 | B1 | 5/2013 | |
| KR | 1020150028110 | A | 3/2015 | |
| KR | 101699896 | B1 | 1/2017 | |
| KR | 101802189 | B1 | 11/2017 | |
| KR | 1020180093329 | A | 8/2018 | |
| WO | 2009045107 | A1 | 4/2009 | |
| WO | 2015119510 | A1 | 8/2015 | |
| WO | 2016175021 | A1 | 11/2016 | |
| WO | 2020146557 | A1 | 7/2020 | |

OTHER PUBLICATIONS

Office Action for Japanese Patent Application No. 2022-547784, Dec. 23, 2024, 5 pages (No English translation available).

Office action for Chinese Patent Application No. 202180023171.4 with English translation of remarks on pp. 3-4, Oct. 17, 2024, 10 pages.

Office Action for European Patent Application No. 21 754 196.0, Jun. 11, 2025, 9 pages.

International Search Report for PCT Application No. PCT/KR2021/001917, mailed Jun. 9, 2021, 7 pages.

Office Action for U.S. Appl. No. 17/172,830, mailed Aug. 4, 2022, 11 pages.

Final Office Action for U.S. Appl. No. 17/172,830, mailed Dec. 22, 2022, 12 pages.

Notice of Allowance for U.S. Appl. No. 17/172,830, mailed Mar. 3, 2023, 8 pages.

* cited by examiner

10

2

LIGHT DEVICE FOR PLANT CULTIVATION

CROSS-REFERENCE TO RELATED APPLICATION

This application is a continuation of U.S. patent application Ser. No. 17/172,830, filed on Feb. 10, 2021, which claims priority from and the benefit of U.S. Provisional Patent Application No. 62/976,886, filed on Feb. 14, 2020, each of which is hereby incorporated by reference for all purposes as if fully set forth herein.

BACKGROUND

Field

Embodiments of the present disclosure relate to a light device for plant cultivation.

Discussion of the Background

Plants produce organic matter from carbon dioxide and water using light energy through photosynthesis. Plants use chemical energy of organic matter obtained through photosynthesis as nutrients for growth.

When plants are grown indoors, such as at home or in a plant factory, it is difficult to provide sufficient natural light to the plants. Accordingly, indoor plant cultivation uses artificial light for growth of plants.

In a typical light device for plant cultivation, light sources or light source modules are arranged at regular intervals. In this case, there may be an overlap of illumination between neighboring light sources. Among regions illuminated with the light device, there are a region illuminated with many light sources and a region illuminated with a relatively small number of light sources.

Here, different regions may have difference in irradiance depending on the number of light sources illuminating the regions. Plants cultivated in different regions exhibit different growth rates due to the difference in irradiance to which the plants are exposed between the regions. A difference in growth between plants cultivated in the same plant cultivation space becomes larger with increasing difference in irradiance between regions in the plant cultivation space.

The above information disclosed in this Background section is only for understanding of the background of the inventive concepts, and, therefore, it may contain information that does not constitute prior art.

SUMMARY

Additional features of the inventive concepts will be set forth in the description which follows, and in part will be apparent from the description, or may be learned by practice of the inventive concepts.

Embodiments of the present disclosure provide a light device for plant cultivation which can minimize plants exhibiting poor growth, thereby ensuring uniform growth of all plants.

In accordance with one or more embodiments of the present disclosure, a light device for plant cultivation includes at least one first light source unit including multiple first light source modules and multiple second light source modules. The multiple first light source modules and the multiple second light source modules may emit light for plant cultivation toward a plant. The multiple first light source modules are arranged at constant intervals. The multiple second light source modules are disposed at least between a pair of first light source modules disposed at both ends of the first light source unit.

In accordance with another embodiment of the present disclosure, a light device for plant cultivation includes a first light source unit, a distance measurement unit, and a controller. The first light source unit may include multiple first light source modules, multiple second light source modules, and a rail on which the multiple first light source modules and the multiple second light source modules are movably mounted. The distance measurement unit may measure a distance between the first light source unit and a plant. The controller may control operation and movement of the multiple first light source modules and the multiple second light source modules based on comparison between the distance measured by the distance measurement unit and a predetermined value.

The multiple first light source modules and the multiple second light source modules may emit light for plant cultivation toward the plant. The multiple second light source modules may be disposed at least between a pair of first light source modules disposed at both ends of the first light source unit.

When the distance measured by the distance measurement unit exceeds a predetermined value, the controller may arrange the multiple first light source modules and the multiple second light source modules in a long-distance mode. Conversely, when the distance measured by the distance measurement unit is less than or equal to the predetermined value, the controller may arrange the multiple first light source modules and the multiple second light source modules in a short-distance mode. In the short-distance mode, the multiple first light source modules and the multiple second light source modules are all arranged at constant intervals. In the long-distance mode, the multiple first light source modules are equidistantly spaced apart from one another by a first distance and each of the multiple light source modules is spaced apart from first light source modules adjacent thereto by a second distance different from the first distance.

In at least one variant, The light device according to claim 9, wherein, based on the comparison value that the measured distance is greater than or equal to the predetermined value, the controller controls the first light source unit to operate and controls the second light source unit to forgo operation, whereas, based on the comparison value that the measured distance is less than the predetermined value, the controller controls the first light source unit to forgo operation and controls the second light source unit to operate.

In at least one variant, the light device for plant cultivation can minimize plants exhibiting poor growth, thereby ensuring uniform growth of all plants.

In another variant, the light device for plant cultivation allows easy replacement of a light source while ensuring uniform growth of all plants.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
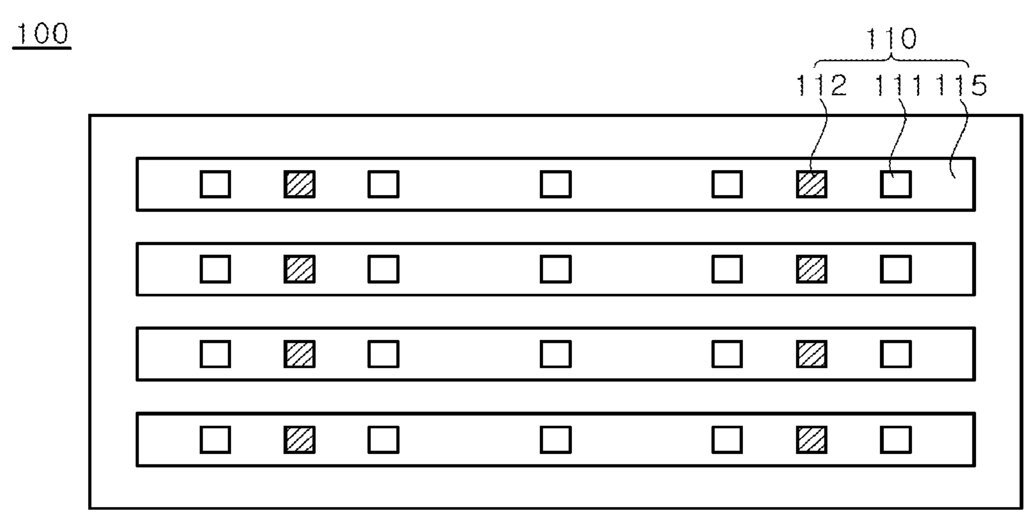
FIG. 1 is a schematic view of a light device for plant cultivation according to a first embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules, such as control boards and control units. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

A light device for plant cultivation according to one or more embodiments of the present disclosure includes a first light source unit including multiple first light source modules and multiple second light source modules.

The multiple first light source modules and the multiple second light source modules may emit light for plant cultivation toward a plant. The multiple first light source modules may be arranged at constant intervals. The multiple second light source modules may be disposed at least between a pair of first light source modules disposed at both ends of the first light source unit.

The light device for plant cultivation may include multiple first light source units.

The light for plant cultivation may be a first type of visible light having a predetermined wavelength.

Each of the first light source module and the second light source module may include multiple light sources. Here, at least one of the multiple light sources may emit light having a different wavelength than the first type of visible light.

For example, the light having a different wavelength than that of the first type of visible light may include at least one selected from among a second type of visible light having a different wavelength than those of the first type of visible light, UV light, and infrared light.

The light device for plant cultivation may further include a distance measurement unit and a controller. The distance measurement unit may measure a distance between the first light source unit and the plant. The controller may control operation of the first light source unit based on comparison between the distance measured by the distance measurement unit and a predetermined value.

When the measured distance is greater than or equal to the predetermined value, the controller may control the first light source unit such that only the multiple first light source modules are operated. Conversely, when the measured distance is less than the predetermined value, the controller may control the first light source unit such that the multiple second light source modules are further operated.

The light device for plant cultivation may further include a second light source unit including multiple first light source modules arranged at constant intervals, the second light source unit emitting light for plant cultivation toward the plant.

The first light source unit may include multiple first light source units and the second light source unit may include multiple second light source units.

The light device for plant cultivation may further include a distance measurement unit and a controller. Here, the distance measurement unit serves to measure a distance between the plant and at least one of the first light source unit and the second light source unit. The controller may control operation of the first light source unit and the second light source unit based on comparison between the distance measured by the distance measurement unit and a predetermined value.

When the measured distance is greater than or equal to the predetermined value, the controller may control the first light source unit and the second light source unit such that only the first light source unit is operated. Conversely, when the measured distance is less than the predetermined value, the controller may control the first light source unit and the second light source unit such that only the second light source unit is operated.

The light device for plant cultivation may further include a third light source unit including at least one third light source module. The third light source unit emits functional light having a different wavelength than the light for plant cultivation toward the plant. The functional light may be UV light.

A light device for plant cultivation according to another embodiment of the present disclosure includes a first light source unit, a distance measurement unit, and a controller. The first light source unit may include multiple first light source modules, multiple second light source modules, and a rail on which the multiple first light source modules and the multiple second light source modules are movably mounted. The distance measurement unit may measure a distance between the first light source unit and a plant. The controller may control operation and movement of the multiple first light source modules and the multiple second light source modules based on comparison between the distance measured by the distance measurement unit and a predetermined value.

The multiple first light source modules and the multiple second light source modules may emit light for plant cultivation toward the plant. The multiple second light source modules may be disposed at least between a pair of first light source modules disposed at both ends of the first light source unit.

When the measured distance exceeds the predetermined value, the controller may arrange the multiple first light source modules and the multiple second light source modules in a long-distance mode. Conversely, when the measured distance is less than or equal to the predetermined value, the controller may arrange the multiple first light source modules and the multiple second light source modules in a short-distance mode.

Here, the short-distance mode means that the multiple first light source modules and the multiple second light source modules are all arranged at constant intervals. The long-distance mode means that the multiple first light source modules are equidistantly spaced apart from one another by a first distance and each of the multiple second light source modules is spaced apart from first light source modules adjacent thereto by a second distance different from the first distance.

The light for plant cultivation may be a first type of visible light having a predetermined wavelength.

The first light source unit may include a light source support and a power connection portion protruding from the light source support. The light source support may be coupled to the rail to be movable along the rail. The power connection portion may be inserted into a light source to secure the light source to the light source support.

In the light device for plant cultivation, each of the first light source module and the second light source module may include multiple light sources. Here, at least one of the multiple light sources may emit light having a different wavelength than the first type of visible light.

The light having a different wavelength than that of the first type of visible light may include at least one selected from among a second type of visible light having a different wavelength than those of the first type of visible light, UV light, and infrared light.

The first light source unit may include a light source support and multiple power connection portions protruding from the light source support. The light source support may be coupled to the rail to be movable along the rail. The multiple light sources may be coupled to the respective power connection portions to be secured to the light source support.

The light device for plant cultivation may further include a third light source unit including at least one third light source module. The third light source unit emits functional light having a different wavelength than the light for plant cultivation toward the plant. The functional light may be UV light.

FIG. 1 is a schematic view of a light device for plant cultivation according to a first embodiment of the present disclosure.

Referring to FIG. 1, the light device for plant cultivation 100 according to the first embodiment includes a light source unit 110 including a support substrate 115, a first light source module 111, and a second light source module 112.

The light device for plant cultivation 100 may include one or more light source units 110.

Both the first light source module 111 and the second light source module 112 emit light for plant cultivation. For example, the light for plant cultivation may be visible light necessary for growth of the plant. In addition, light emitted from the first light source module 111 may have the same wavelength as that of light emitted from the second light source module 112.

In another embodiment, each of the first light source module 111 and the second light source module 112 may include multiple light sources. At least one of the multiple light sources may emit a first type of visible light having a predetermined wavelength. In addition, at least another of the multiple light sources may emit a second type of visible light having a different wavelength than the first type of visible light, UV light, or infrared light.

That is, among the multiple light sources, there may be a light source emitting the first type of visible light and at least one selected from among a light source emitting the second type of visible light, a light source emitting UV light, and a light source emitting infrared light.

The support substrate 115 supports the first light source module 111 and the second light source module 112 such that the light for plant cultivation emitted from the light source unit 110 is directed to the plant. In some forms, the support substrate 115 may serve to support the first light source module 111 and the second light source module 112. Alternatively, the support substrate 115 may be an interconnect substrate which is formed with an interconnect electrically connected to the first light source module 111 and the second light source module 112.

The light source unit 110 may include multiple first light source modules 111 and multiple second light source modules 112. For example, the light source unit 110 may include three or more first light source modules 111 and two second light source modules 112.

In some forms, the multiple first light source modules 111 are arranged at predetermined equidistant intervals. That is, distances between the first light source modules 111 are all the same.

The second light source module 112 is disposed between two first light source modules 111. Accordingly, a distance between the second module light source and a first light source module 111 adjacent thereto is different from a distance between a pair of adjacent first light source modules 111.

The second light source module 112 is disposed between a pair of first light source modules 111 disposed at both ends of the light source unit 110.

With this arrangement of the multiple first light source modules 111 and the two second light source modules 112, the light source unit 110 includes both an equidistant array of light source modules and a non-equidistant array of light source modules.

Figure 2:
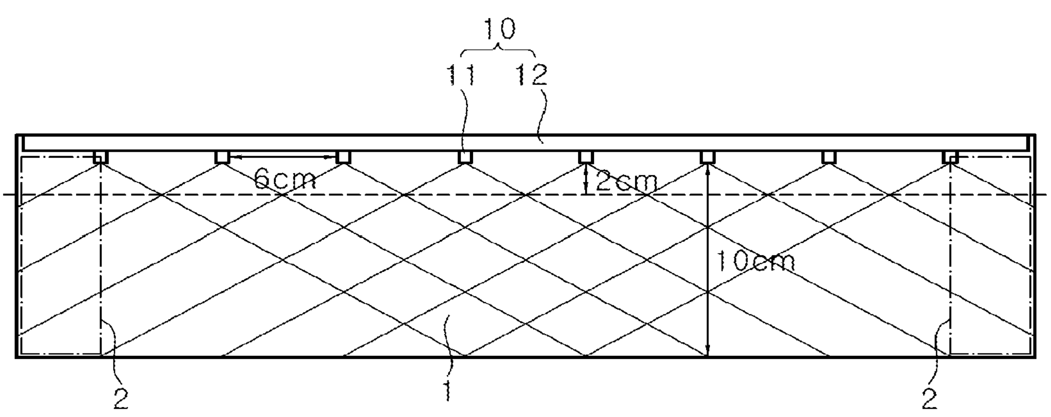
FIG. 2 illustrates a typical light device for plant cultivation, in which light source modules are arranged equidistantly.
Figures 3, 4:
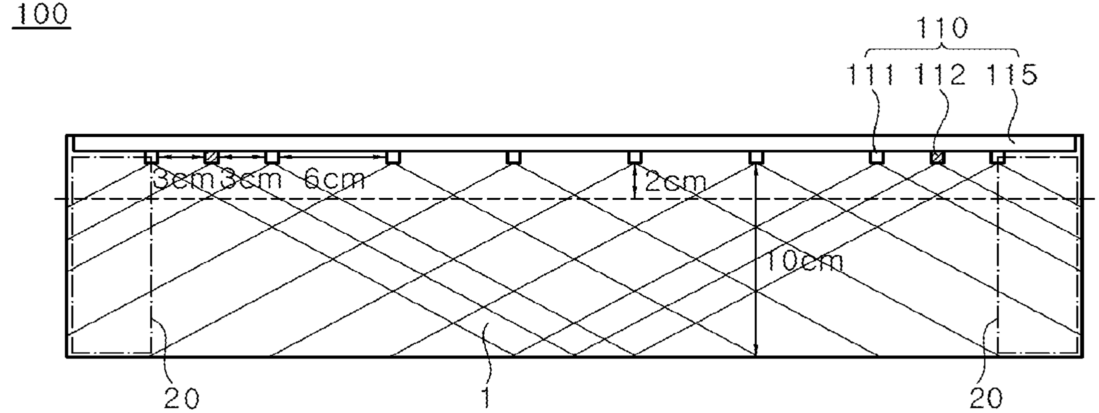
FIG. 3 illustrates light distribution of the light device of FIG. 2.
FIG. 4 illustrates a light device for plant cultivation according to the first embodiment, in which light source modules are arranged both equidistantly and non-equidistantly.

FIG. 2 and FIG. 3 illustrate one form of light distribution of a typical light device for plant cultivation, in which light source modules 111 are arranged equidistantly.

FIG. 4 illustrates light distribution of the light device for plant cultivation, in which light source modules are arranged both equidistantly and non-equidistantly according to the first embodiment of the present disclosure.

Referring to FIG. 2, eight light source modules each having a directional angle of 120° are arranged at intervals of 6 cm in a plant cultivation space 1 having a height of 10 cm. Here, the height refers to a distance between the bottom of the plant cultivation space and the light source module.

Referring to FIG. 2, it can be seen that all points at a distance of 2 cm from the light source modules are illuminated at the same irradiance.

However, beyond 2 cm from the light source modules, there are regions illuminated at different irradiances. Referring to FIG. 2, at distances of more than 2 cm to 10 cm from the light source modules, there are differences in irradiance depending on regions.

Referring to FIG. 3, it can be seen that much less light is distributed to an outer region of the plant cultivation space 1 than to a central region of the plant cultivation space 1.

In addition, referring to FIG. 3, it can be seen that region A (designated by reference numeral 2 in FIG. 2) illuminated at a lower irradiance than the other regions is formed over a wide area on the edge of the plant cultivation space 1.

The region A 2 located at both outer sides of the plant cultivation space is illuminated with a maximum of three light source modules. In addition, the region A 2 is illuminated with only one light source module over a larger area than a region inside an outermost light source module.

The region inside the outermost light source module is illuminated with one light source module over a smaller area than the region A 2. In addition, the region inside the outermost light source module is illuminated with two or more light source modules in most sections and also has a section illuminated with a maximum of six light source modules.

As such, the region area A 2 is illuminated at a very low irradiance on average, as compared with the other regions.

Irradiance to which a plant is exposed has an influence on the growth rate of the plant. Accordingly, there is a difference in growth rate between a plant grown in the region A 2 of the plant cultivation space 1 and a plant grown in the central region of the plant cultivation space 1, which is illuminated at a relatively high irradiance on average.

In addition, plants exhibiting poor growth increases with the increasing area of the region A 2.

Accordingly, in order to minimize plants exhibiting poor growth in cultivation in the same plant cultivation space 1, the area of the region A 2, which is illuminated at a lowest irradiance, may be reduced.

According to one embodiment of the present disclosure, multiple light source modules having a directional angle of 120° are arranged both equidistantly and non-equidistantly in the plant cultivation space 1 having a height of 10 cm, as shown in FIG. 2.

Referring to FIG. 4, the multiple light source modules are eight first light source modules 111 and two second light source modules 112. The second light source module 112 is disposed between a pair of first light source modules 111 disposed at both ends of the light device for plant cultivation 100. The first light source modules 111 are spaced 6 cm apart from one another and the second light source module 112 is spaced 3 cm apart from first light source modules 111 adjacent thereto.

Referring to FIG. 4, region B (designated by reference numeral 20) located outside both outermost first light source modules 111 is illuminated with a maximum of four light source modules. That is, the region B 20 of FIG. 4 is illuminated with a larger number of light source modules than the region A 2 of FIG. 2.

In addition, the region B 20 of FIG. 4 is illuminated with one light source module over a smaller area than the region A 2 of FIG. 2. Further, in the region B 20 of FIG. 4, an overlap of illumination between multiple light source modules occurs over a larger area than in the region A 2 of FIG. 2. Accordingly, on average, the region B 20 of FIG. 4 is illuminated at a higher irradiance than the region A 2 of FIG. 2.

With the second light source module 112 spaced apart from first light source modules adjacent thereto by a distance different from the distance between the first light source modules 111, it is possible to reduce a difference in irradiance between the region B 20 disposed at both ends of the plant cultivation space 1 and the central region of the plant cultivation space 1. As such, with the second light source module 112 disposed to form a non-equidistant array of light source modules, the light device for plant cultivation 100 according to this embodiment can minimize the area of a region illuminated at lowest irradiance. That is, the light device for plant cultivation 100 according to this embodiment can secure a uniform light distribution throughout the plant cultivation space 1. Accordingly, the light device for plant cultivation 100 according to this embodiment can prevent plants in the outer area exhibiting poor growth, as compared with plants grown in the central region of the plant cultivation space 1.

Next, other embodiments of the light device for plant cultivation will be described. Here, descriptions of the structure, operation, and function of the same components as those of the above embodiment will be briefly given or omitted. For details of components briefly described or not described, refer to the description of the above embodiment.

Figure 5:
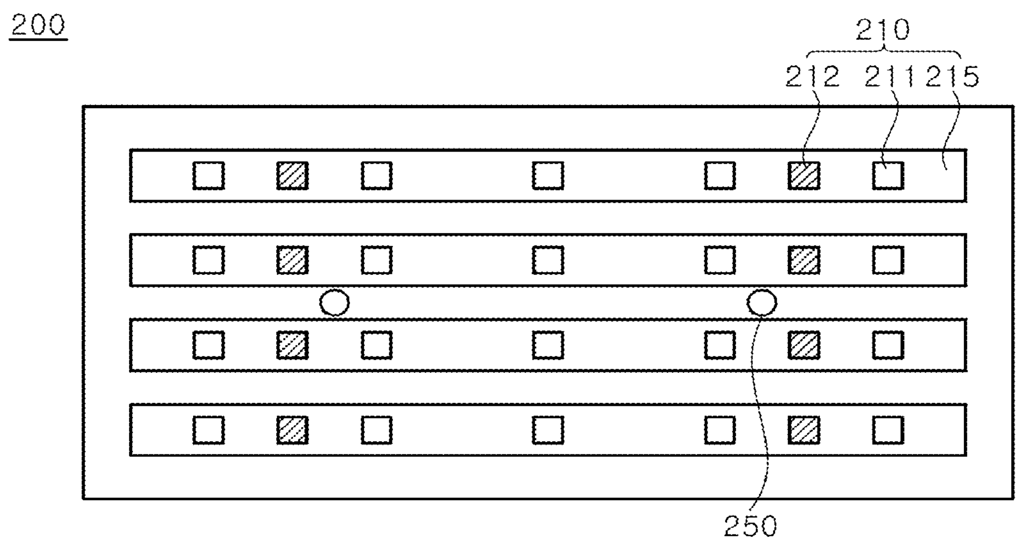
FIG. 5 is a plan view of a light device for plant cultivation according to a second embodiment of the present disclosure.
Figure 6:
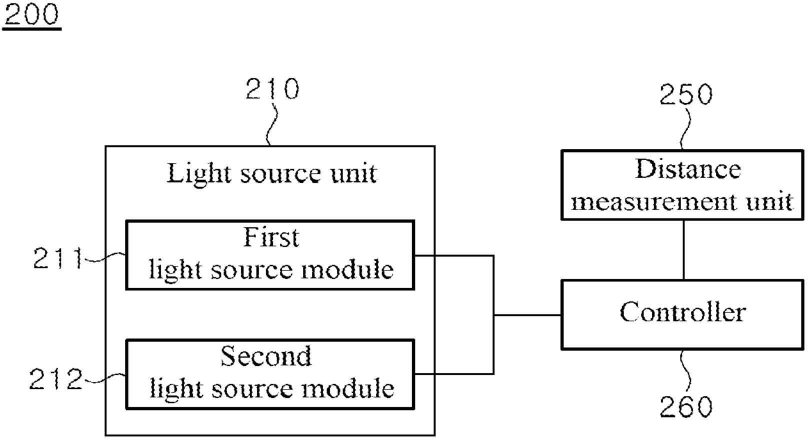
FIG. 6 is a schematic block diagram of the light device of FIG. 5.

FIG. 5 and FIG. 6 illustrate a light device for plant cultivation according to a second embodiment of the present disclosure.

FIG. 5 is a plan view of a light device for plant cultivation 200 according to the second embodiment of the present disclosure. FIG. 6 is a schematic block diagram of the light device for plant cultivation 200 according to the second embodiment.

Referring to FIG. 5 and FIG. 6, the light device for plant cultivation 200 includes multiple light source units 210, a distance measurement unit 250, and a controller 260.

The light source unit 210 includes a support substrate 215, multiple first light source modules 211, and multiple second light source modules 212. For details of arrangement of the multiple first light source modules 211 and the multiple second light source modules 212, refer to description of the light source unit 110 (FIG. 1) of the light device for plant cultivation 100 (FIG. 1) of the first embodiment. Although the light device for plant cultivation 200 is shown as including multiple light source units 210 arranged side by side, it will be understood that the present disclosure is not limited thereto and the light device for plant cultivation 200 may include only one light source unit 210.

The light device for plant cultivation 200 according to the second embodiment differs from the light device for plant cultivation 100 (FIG. 1) according to the first embodiment in that the light device for plant cultivation 200 further includes the distance measurement unit 250 and the controller 260.

The distance measurement unit 250 is disposed at the same position as the light source unit 210 to measure a distance to a plant grown in the plant cultivation space 1. Accordingly, the distance measured by the distance measurement unit 250 may be a distance between the light source unit 210 and the plant or between the light source module and the plant.

The distance measurement unit 250 may include any sensor capable of measuring a distance to a target object, such as an ultrasonic sensor or an infrared sensor.

The distance measurement unit 250 transmits, to the controller 260, a signal including a result of measuring the distance between the light source unit 210 and the plant.

The controller 260 receives the signal from the distance measurement unit 250. Then, the controller 260 compares the distance between the light source unit 210 and the plant, included in the received signal, with a predetermined value. Then, the controller 260 controls operation of the light source unit 210 based on comparison between the measured distance and the predetermined value.

For example, when the measured distance is less than or equal to the predetermined value, the controller 260 may control the light source unit 210 such that only the first light source modules 211 are operated. Conversely, when the measured distance exceeds the predetermined value, the controller 260 may control the light source unit 210 such that both the first light source modules 211 and the second light source modules 212 are operated. Here, the predetermined value may be 2 cm by way of example.

Accordingly, when the distance between the light source unit 210 and the plant exceeds the predetermined value, the light device for plant cultivation 200 according to the second embodiment can increase irradiance in the region A (designated by 2 in FIG. 4) by operating both the first light source modules 211 and the second light source modules 212, as shown in FIG. 4.

In this way, with the distance measurement unit 250, the light device for plant cultivation 200 according to the second embodiment can automatically operate the second light source modules 212 depending on the height of the plant.

Although one distance measurement unit 250 is disposed on the support substrate 215 in FIG. 6, it will be understood that the present disclosure is not limited thereto and two or more distance measurement units 250 may be disposed. Although the distance measurement unit 250 is shown as disposed between a pair of first light source modules 211, it will be understood that the present disclosure is not limited thereto and the distance measurement unit 250 may be disposed at various locations which allows measurement of the distance between the light source unit 210 and the plant.

Figure 7:
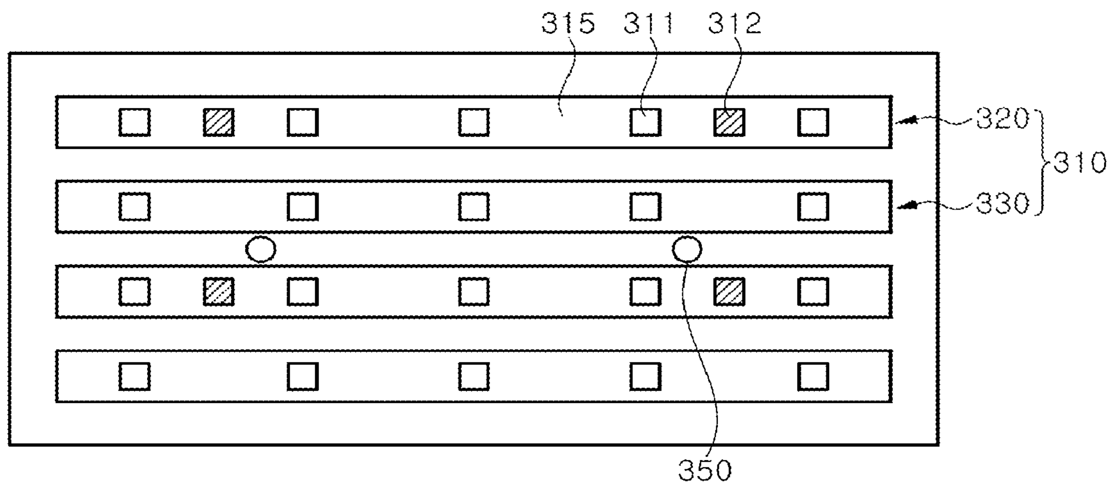
FIG. 7 is a plan view of a light device for plant cultivation according to a third embodiment of the present disclosure.
Figure 8:
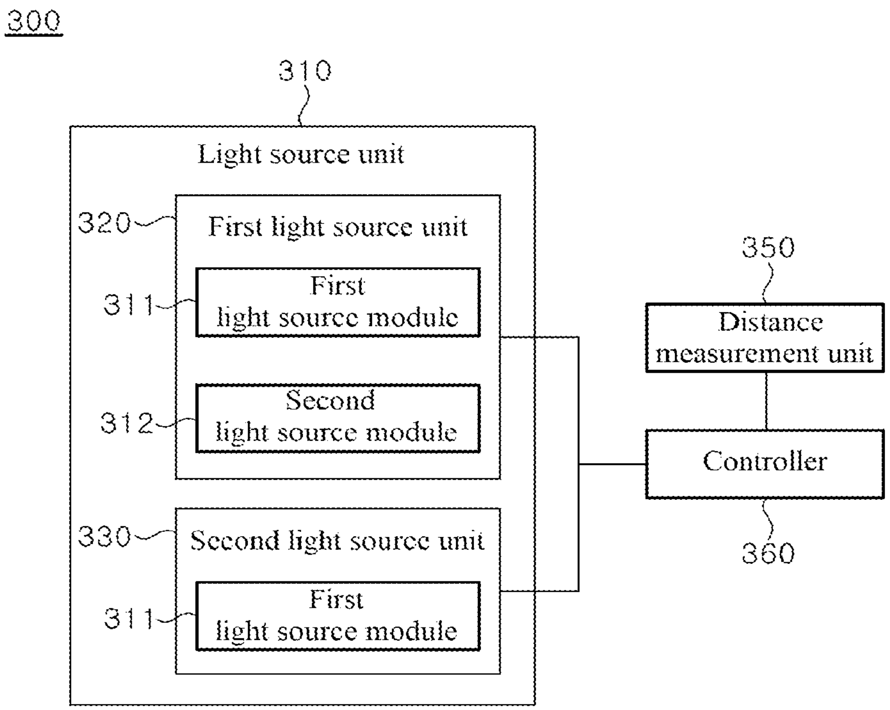
FIG. 8 is a schematic block diagram of the light device of FIG. 7.

FIG. 7 and FIG. 8 illustrate a light device for plant cultivation according to a third embodiment of the present disclosure.

FIG. 7 is a plan view of a light device for plant cultivation 300 according to the third embodiment of the present disclosure. FIG. 8 is a schematic block diagram of the light device for plant cultivation 300 according to the third embodiment.

Referring to FIG. 7 and FIG. 8, the light device for plant cultivation 300 according to the third embodiment includes a light source unit 310, a distance measurement unit 350, and a controller 360.

The light source unit 310 includes at least one pair of first and second light source units 320, 330.

In this embodiment, the light source unit 310 includes multiple first light source units 320 and multiple second light source units 330. However, it will be understood that the present disclosure is not limited thereto and the light source unit 310 may include one first light source unit 320 and one second light source unit 330.

The first light source unit 320 includes multiple first light source modules 311 and multiple second light source modules 312. For example, the first light source unit 320 may be the light source unit 110 (FIG. 1) of the light device for plant cultivation 100 (FIG. 1) according to the first embodiment described above. Accordingly, the first light source unit 320 includes a combination of an equidistant array of light source modules and a non-equidistant array of light source modules.

The second light source unit 330 includes multiple first light source modules 311. That is, the second light source unit 330 includes an equidistant array of light source modules.

The distance measurement unit 350 measures a distance from each of the first light source unit 320 and the second light source unit 330 to a plant in the plant cultivation space.

For example, at least one distance measurement unit 350 may be disposed between the first light source unit 320 and the second light source unit 330. Referring to FIG. 7, multiple distance measurement units 350 are disposed between the first light source unit 320 and the second light source unit 330. Alternatively, at least one distance measurement unit 350 may be disposed on each of a support substrate 315 of the first light source unit 320 and a support substrate 315 of the second light source unit 330.

The controller 360 operates the first light source unit 320 and the second light source unit 330 based on a signal including the distance measured by the distance measurement unit 350. The controller 360 controls the first light source unit 320 and the second light source unit 330 based on comparison between the received measured distance and a predetermined value.

For example, when the distance measured by the distance measurement unit 350 is less than or equal to the predetermined value, the controller 360 controls the second light source unit 330 to emit light. Here, the controller 360 may perform the control such that the first light source unit 320 is not operated.

Conversely, when the distance measured by the distance measurement unit 350 exceeds the predetermined value, the controller 360 controls the first light source unit 320 to emit light. Here, the controller 360 may perform control such that the second light source unit 330 is not operated during operation of the first light source unit 320.

However, the operation of the light device for plant cultivation 300 is not limited thereto. The controller 360 of the light device for plant cultivation 300 may control the light source unit 310 such that the second light source unit 330 also emits light when the first light source unit 320 emits light.

FIG. 9 to FIG. 13 illustrate a light device for plant cultivation according to a fourth embodiment of the present disclosure.

Figure 9:
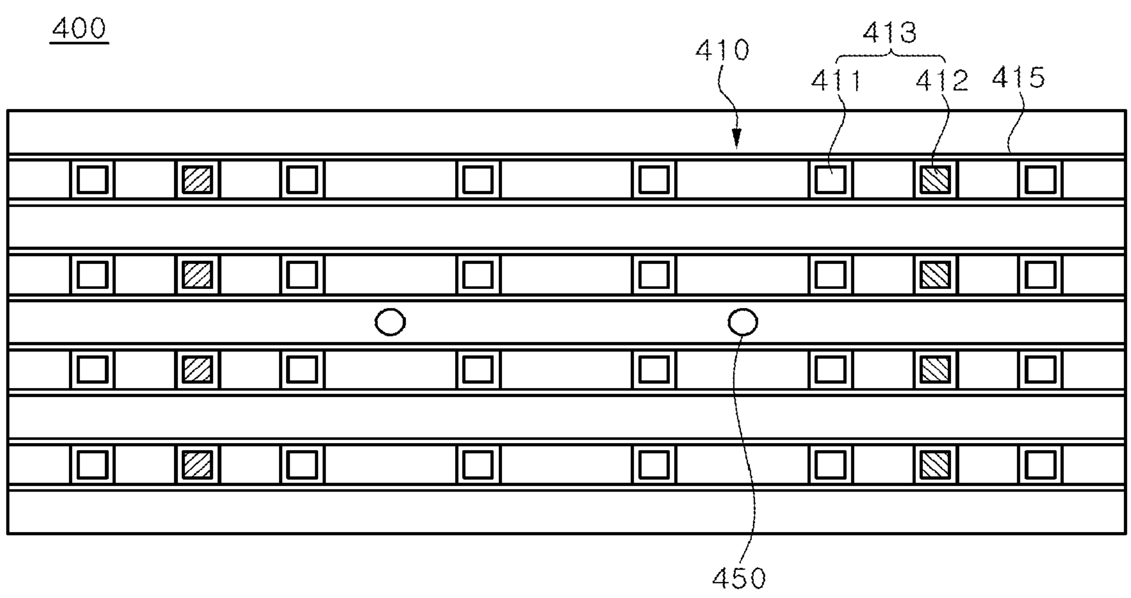
FIG. 9 is a plan view of a light device for plant cultivation according to a fourth embodiment of the present disclosure.
Figure 10:
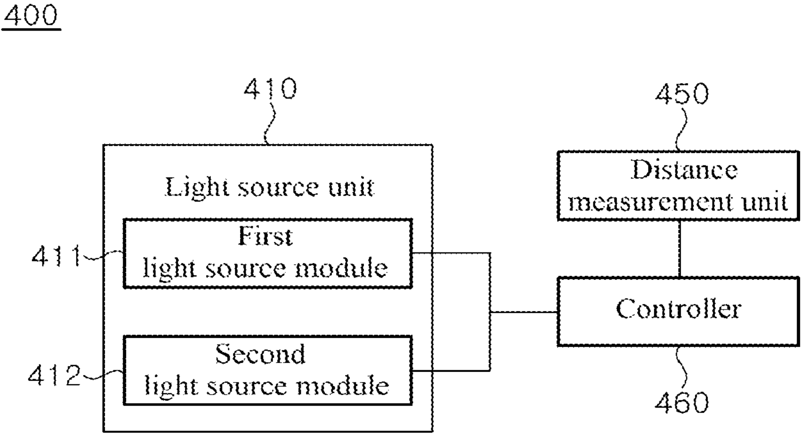
FIG. 10 is a schematic block diagram of the light device of FIG. 9.
Figure 11:
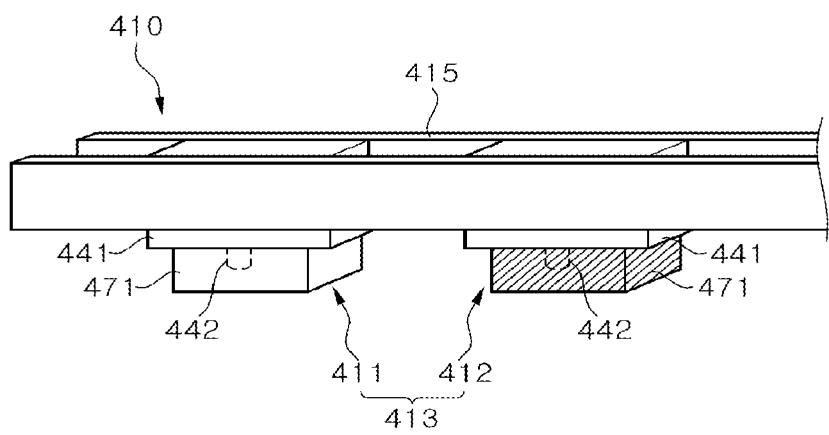
FIG. 11 is a perspective view of a light source unit of the light device of FIG. 9.
Figure 12:
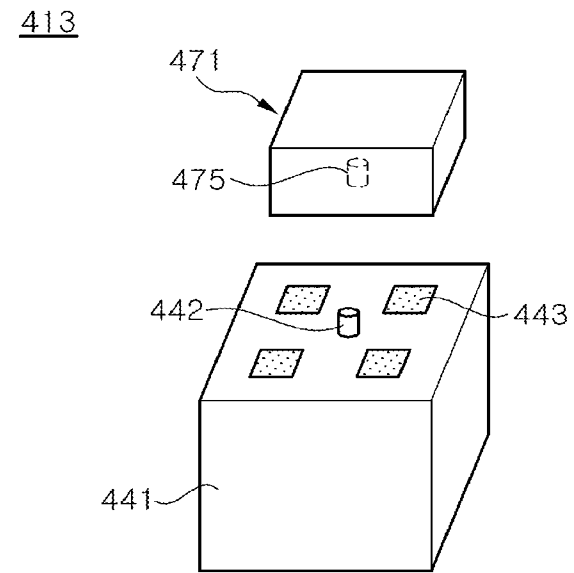
FIG. 12 is a schematic view of a light source module of the light device of FIG. 9.
Figure 13:
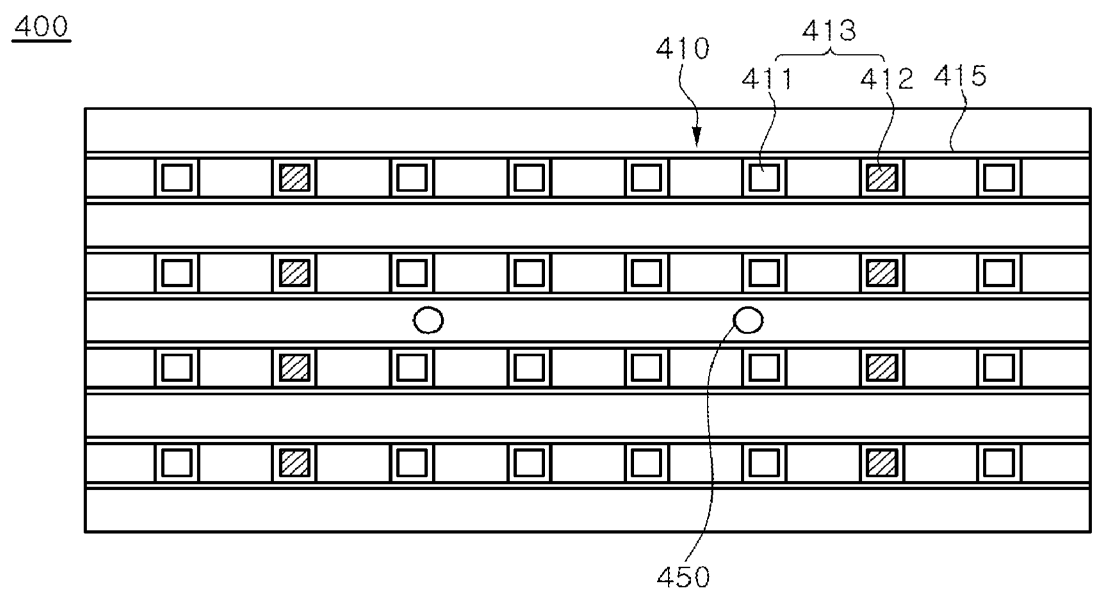
FIG. 13 illustrates a short-distance mode of the light device of FIG. 9.

FIG. 9 is a plan view of a light device for plant cultivation 400 according to the fourth embodiment of the present disclosure. FIG. 10 is a schematic block diagram of the light device for plant cultivation 400 according to the fourth embodiment. FIG. 11 is a perspective view of a light source unit 410 of the light device for plant cultivation 400 according to the fourth embodiment. FIG. 12 is a schematic view of a light source module 413 of the light device for plant cultivation 400 according to the fourth embodiment. FIG. 13 shows a short-distance mode of the light device for plant cultivation 400 according to the fourth embodiment.

The light device for plant cultivation 400 according to the fourth embodiment includes a light source unit 410, a distance measurement unit 450, and a controller 460.

The light source unit 410 includes multiple first light source modules 411, multiple second light source modules 412, and a rail 415.

For example, the light source unit 410 may include multiple first light source modules 411 and two second light source modules 412. Here, the second light source module 412 may be disposed between a pair of first light source modules 411 disposed at both ends of the light source unit 410.

The first light source module 411 and the second light source module 412 may be the same light source module that emits light having the same wavelength. However, for convenience of description and understanding, the same light source module is divided into the first light source module 411 and the second light source module 412 based on locations thereof.

The multiple first light source modules 411 and the multiple second light source modules 412 emit light for plant cultivation. In addition, the first light source modules 411 and the second light source modules 412 are mounted on the rail 415 to be movable along the rail 415 in response to a signal from the controller 460.

Referring to FIG. 11, each of the first light source module 411 and the second light source module 412 includes a light source 471, a light source support 441, and a power connection portion 442.

The light source support 441 is a body coupled to the rail 415 to be movable along the rail 415.

The power connection portion 442 is formed on the light source support 441 to protrude from an upper surface of the light source support 441.

The light source 471 generates and emits light and is formed with a recessed groove 475 corresponding to the power connection portion 442. The light source 471 is disposed on the upper surface of the light source support 441.

The power connection portion 442 is inserted into the groove 475 of the light source 471, as shown in FIG. 12. Upon coupling of the power connection portion 442 to the light source 471, the light source 471 is electrically connected to the power connection portion 442 and is secured to the light source support 441.

Although not shown in the drawings, the light source 471 may include a light emitting diode generating and emitting light and a housing. The light emitting diode may be disposed inside the housing or on an upper surface of the housing. The groove 475 into which the power connection portion 442 is inserted may be formed on a lower surface of the housing. The housing may include a body formed of an electrically insulating material and an interconnect formed of a conductive material to be electrically connected to the light emitting diode. Here, the interconnect formed of a conductive material may have any structure that allows electrical connection between the light emitting diode and the power connection portion 442 upon insertion of the power connection portion 442 into the groove 475.

In addition, the light source module may further include a light source securing portion 443 formed on one surface of the light source support 441.

For example, the light source securing portion 443 may be formed of a magnet. Here, a portion of a lower surface of the light source 471 may also be formed of a magnet. Accordingly, upon coupling of the light source 471 to the power connection portion 442, the light source 471 can be more firmly secured to the light source support 441 by magnetic force of the light source securing portion 443.

The present disclosure has been described by way of an example in which the light source securing portion 443 is formed of a magnet to secure the light source 471 to the light source support 441 by magnetic force thereof. However, a method of securing the light source 471 to the light source support 441 is not limited thereto. The light source 471 may be secured to the light source support 441 in various other ways, for example, by varying the material or structure of the light source securing portion 443.

The distance measurement unit 450 measures a distance between the light source unit 410 and the plant.

Upon receiving an external signal such as a power signal, the controller 460 may control the light source unit 410 such that both the first light source modules 411 and the second light source modules 412 emit light.

The controller 460 controls the light source unit 410 based on comparison between the distance between the light source unit 410 and the plant, received from the distance measurement unit 450, and a predetermined value.

For example, when the distance between the light source unit 410 and the plant is less than or equal to the predetermined value, the controller 460 arranges the multiple first light source modules 411 and the multiple second light source modules 412 in a short-distance mode.

In the short-distance mode, the multiple first light source modules 411 and the multiple second light source modules 412 are all arranged at equal intervals, as shown in FIG. 13.

Conversely, when the distance between the light source unit 410 and the plant exceeds the predetermined value, the controller 460 arranges the multiple first light source modules 411 and the multiple second light source modules 412 in a long-distance mode.

In the long-distance mode, the multiple first light source modules 411 are equidistantly spaced apart from one another by a first distance. In addition, in the long-distance mode, the second light source module 412 is spaced a second distance apart from first light source modules 411 adjacent thereto. Here, the second distance is different from the first distance.

That is, the first light source modules 411 are arranged at equal intervals and the second light source module 412 and first light source modules 411 adjacent thereto are arranged at intervals different from the intervals between the first light source modules 411. Accordingly, in the long-distance mode, light source modules 413 of the light source unit 410 are arranged both equidistantly and non-equidistantly, as shown in FIG. 9.

The light device for plant cultivation 400 according to this embodiment can change the arrangement of the light source modules 413 depending on the height of the plant to minimize the area of a region illuminated at lowest irradiance, thereby reducing the number of plants exhibiting poor growth.

Figure 14:
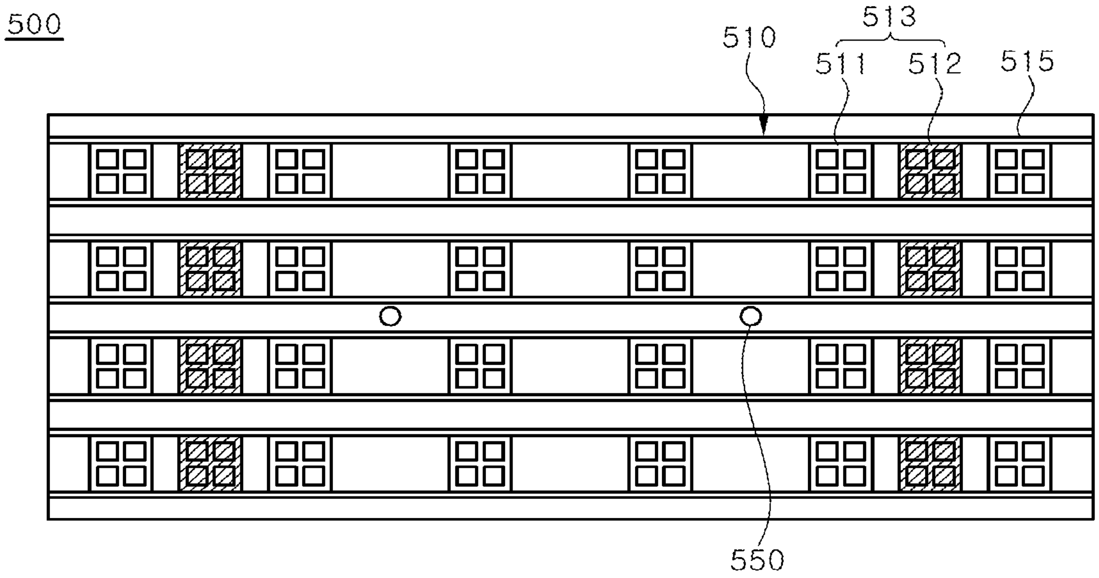
FIG. 14 is a plan view of a light device for plant cultivation according to a fifth embodiment of the present disclosure.
Figure 15:
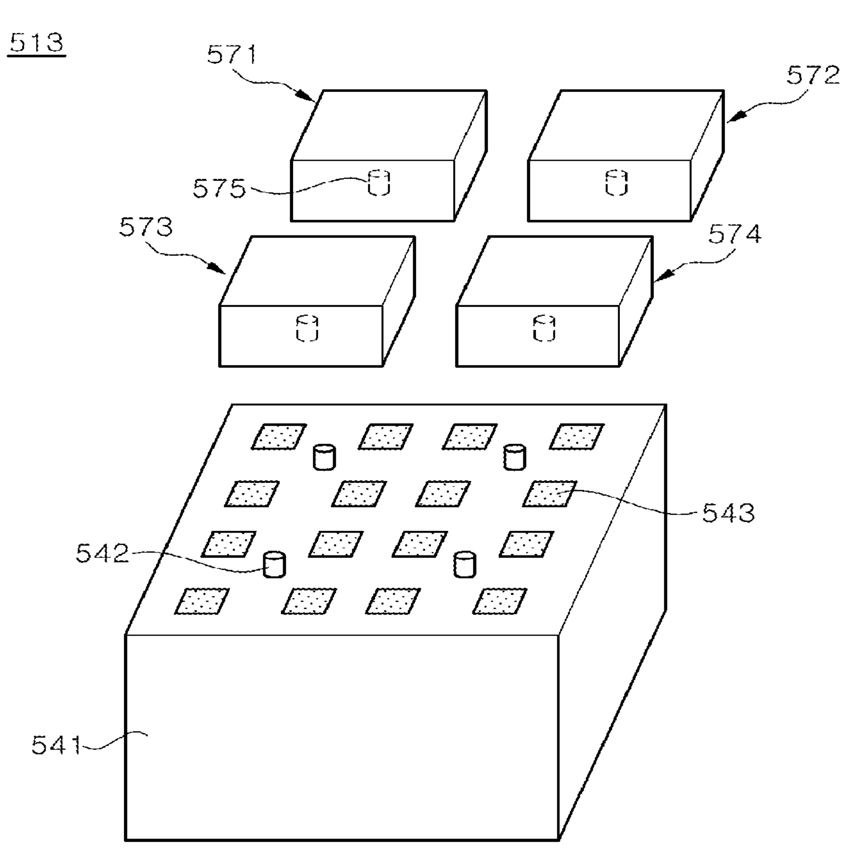
FIG. 15 illustrates a light source module of the light device of FIG. 14.

FIG. 14 and FIG. 15 are views of a light device for plant cultivation according to a fifth embodiment of the present disclosure.

FIG. 14 is a plan view of a light device for plant cultivation 500 according to the fifth embodiment. FIG. 15 is a perspective view of a light source module 513 of the light device for plant cultivation 500 according to the fifth embodiment.

The light device for plant cultivation 500 according to the fifth embodiment includes a light source unit 510, a distance measurement unit 550, and a controller (not shown). For details of the distance measurement unit 550 and the controller, refer to description of the distance measurement unit 450 (FIG. 10) and the controller 460 (FIG. 10) of the light device for plant cultivation 400 (FIG. 10) according to the fourth embodiment.

The light source unit 510 includes a first light source module 511, a second light source module 512, and a rail 515.

Each of the first light source module 511 and the second light source module 512 includes a light source support 541, power connection portions 542, and multiple light sources.

The multiple light sources are disposed on the light source support 541. At least one of the multiple light sources emits a first type of visible light, which is light for plant cultivation. In addition, at least one of the multiple light sources may emit at least one selected from among a second type of visible light, infrared light, and UV light. Here, the second type of visible light is visible light having a different wavelength than the wavelength of the first type of visible light.

For example, the multiple light sources may include a first light source 571, a second light source 572, a third light source 573, and a fourth light source 574. Here, the first light source 571 may emit the first type of visible light, which is light for plant cultivation. The second light source 572 may emit the second type of visible light. The third light source 573 may emit infrared light. The fourth light source 574 may emit UV light.

The power connection portions 542 are formed on an upper surface of the light source support 541 to be inserted into grooves 575 formed in the first to fourth light sources 571 to 574, respectively. The number of power connection portions 542 may correspond to the number of light sources disposed on the upper surface of the light source support 541.

For example, when the first to fourth light sources 571 to 574 are disposed on the light source support 541, four power connection portions 542 may be formed on the light source support 541. Accordingly, the first to fourth light sources 571 to 574 may be coupled to the respective power connection portions 542.

In addition, light source securing portions 543 may be formed in regions on the upper surface of the light source support 541, in which the first to fourth light sources 571 to 574 are disposed, respectively.

The light device for plant cultivation 500 according to this embodiment allows free attachment/detachment of the light sources. Thus, the light device for plant cultivation 500 according to this embodiment can adjust irradiance through adjustment of the number of light sources attached to the light source support 541. Further, the light device for plant cultivation 500 of this embodiment allows replacement of any light source with another light source having a desired wavelength, as needed.

Figure 16:
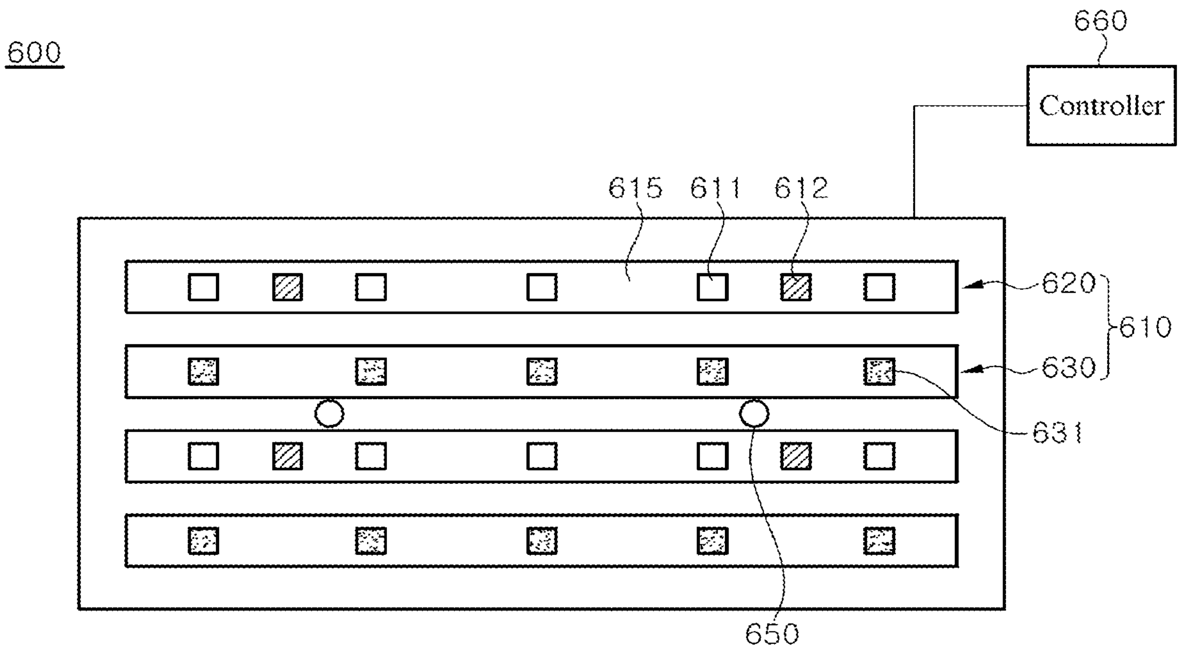
FIG. 16 is a schematic view of a light device for plant cultivation according to a sixth embodiment of the present disclosure.

FIG. 16 is a schematic view of a light device for plant cultivation according to a sixth embodiment of the present disclosure.

Referring to FIG. 16, a light device for plant cultivation 600 according to the sixth embodiment includes a light source unit 610, a distance measurement unit 650, and a controller 660.

The light source unit 610 includes at least one pair of first and third light source units 620, 630.

In this embodiment, the light source unit 610 includes multiple first light source units 620 and multiple third light source units 630. However, it will be understood that the present disclosure is not limited thereto and the light source unit 610 may include one first light source unit 620 and one third light source unit 630.

The first light source unit 620 includes multiple first light source modules 611 and multiple second light source modules 612. For example, the first light source unit 620 may be the light source unit 110 (FIG. 1) of the light device for plant cultivation 100 (FIG. 1) of the first embodiment described above. Accordingly, the first light source unit 620 includes multiple light source modules arranged both equidistantly and non-equidistantly.

The third light source unit 630 includes multiple third light source modules 631.

The third light source module 631 emits light having a different wavelength than light emitted from the first light source module 611 and the second light source module 612. The third light source module 631 emits functional light having a different function than light emitted from the first light source unit 620.

For example, the third light source module 631 may emit UV light promoting production of phytochemicals in a plant. Supply of UV light to a plant can increase the content of phytochemicals in the plant. In addition, the third light source module 631 may emit infrared light or visible light having a different wavelength than visible light emitted from the first light source unit 620, as well as UV light. Alternatively, the third light source module 631 may include multiple light sources emitting light having different wavelengths.

The distance measurement unit 650 measures a distance between the first light source unit 620 or the third light source unit 630 and a plant in the plant cultivation space.

For example, at least one distance measurement unit 650 may be disposed between the first light source unit 620 and the third light source unit 630. Alternatively, at least one distance measurement unit 650 may be disposed on each of a support substrate 615 of the first light source unit 620 and the support substrate 615 of the third light source unit 630.

The controller 660 operates the first light source module 611 and the second light source module 612 of the first light source unit 620 based on a signal including the distance measured by the distance measurement unit 650.

For example, when the distance measured by the distance measurement unit 650 is less than or equal to a predetermined value, the controller 660 controls the first light source unit 620 such that the first light source modules 611 emit light. Here, the controller 660 performs control such that the second light source modules 612 are not operated.

Conversely, when the distance measured by the distance measurement unit 650 exceeds the predetermined value, the controller 660 controls the first light source unit 620 such that both the first light source modules 611 and the second light source modules 612 emit light.

In addition, the controller 660 may control the third light source unit 630 based on an external input signal. Alternatively, the controller 660 may control the third light source unit 630 based on pre-stored data. For example, the light device for plant cultivation 600 may store operation time and conditions of the third light source unit 630.

The light source unit 610 according to this embodiment differs from the light source unit 110 (FIG. 1) of the light device for plant cultivation 100 (FIG. 1) according to the first embodiment in that the light source unit 610 further includes the third light source unit 630. Here, the first light source unit 620 according to this embodiment corresponds to the light source unit 100 (FIG. 1) according to the first embodiment. However, the configuration of the light source unit 610 according to this embodiment is not limited thereto. For example, the light source unit 610 may include the first light source unit 620 and the third light source unit 630, wherein the first light source unit 620 may be the light source unit 310 (FIG. 7) of the light device for plant cultivation 310 (FIG. 7) according to the third embodiment.

Although the first light source module 611 and the second light source module 612 of the first light source unit 610 are described as secured to one support substrate 615, it will be understood that the present disclosure is not limited thereto. Alternatively, the first light source module 611 and the second light source module 612 may be secured to a rail to be moved and arranged at predetermined unequal or equal intervals depending on the distance to the plant, as in the light device for plant cultivation 500 according to the fifth embodiment as shown in FIG. 11 to FIG. 13.

The light device for plant cultivation 600 according to this embodiment includes the first light source unit 620 providing light as uniformly as possible throughout the plant cultivation space and the third light source 630 providing a different type of light than the first light source unit 620. Accordingly, the light device for plant cultivation 600 according to this embodiment can improve functional properties of the plant, such as phytochemical content, while allowing all plants in the plant cultivation space to grow uniformly.

Although some exemplary embodiments have been described herein, it should be understood that these exemplary embodiments are provided for illustration only and are not to be construed in any way as limiting the inventive concepts of the present disclosure, and that various modifications, changes, alterations, and equivalent exemplary embodiments can be made by those skilled in the art.

Accordingly, the inventive concepts are not limited to such exemplary embodiments, but rather to the broader scope of the presented claims and various obvious modifications and equivalent arrangements.

What is claimed is:

1. A light device comprising:

a first light source comprising multiple first light emitters and multiple second light emitters, a distance measurer configured to measure a distance between the first light source and a target; and a controller configured to control operation of the first light source based on a comparison between the distance measured by the distance measurer and a predetermined value;

wherein the multiple first light emitters and the multiple second light emitters are configured to emit light toward the target, and the multiple second light emitters are disposed at least between a pair of first light emitters, at least one of the multiple first light emitters is disposed between a pair of first light emitters without any intervening second light emitters, the multiple first light emitters are operated together and the multiple second light emitters are operated together, wherein each of a plurality of the multiple first light emitters is configured to emit light having a first peak wavelength and each of a plurality of the multiple second light emitters is configured to emit light having a second peak wavelength, wherein the second peak wavelength differs from the first peak wavelength, wherein at least one of: the multiple first light emitters or the multiple second light emitters, includes at least one light emitter configured to emit light having a third peak wavelength that differs from a corresponding first peak wavelength or second peak wavelength of the at least one of: the multiple first light emitters or the multiple second light emitters, wherein a distance between a second light emitter of the multiple second light emitters and a first light emitter of the multiple first light emitters located adjacent there to is different from a distance between a pair of adjacent first light emitters of the multiple first light emitters, wherein, based on the comparison that the measured distance is greater than or equal to the predetermined value, the controller is configured to control the first light source such that the multiple first light emitters are operated, and wherein, based on the comparison that the measured distance is less than the predetermined value, the controller is configured to control the first light source such that the multiple second light emitters are operated.

2. The light device according to claim 1, wherein the multiple first light emitters and the multiple second light emitters emit visible light.

3. The light device according to claim 1, wherein the multiple first light emitters and multiple second light emitters are arranged in a first linear pattern, the light device further comprising a second light source comprising multiple third light emitters arranged in a second linear pattern distinct from the first linear pattern.

4. The light device according to claim 1, wherein the third peak wavelength comprises visible light, UV light, infrared light, or a combination of two or more thereof.

5. The light device according to claim 1, wherein an intensity of the light having the third peak wavelength is lower than an intensity of the corresponding first peak wavelength or second peak wavelength.

6. The light device according to claim 1, wherein the target is a plant, the light device further comprising: a second light source comprising another multiple first light emitters arranged at constant intervals, the second light source emitting light for plant cultivation toward the plant.

7. The light device according to claim 6, wherein the light device comprises multiple first light sources and multiple second light sources.

8. The light device according to claim 6, wherein the distance measurer is further configured to measure a second distance between the plant and the second light source, wherein the controller is further configured to control the first light source and/or the second light source based on the second distance.

9. The light device according to claim 6, wherein, based on the comparison that the measured distance is greater than or equal to the predetermined value, the controller is configured to control the first light source to operate and control the second light source to forgo operation, wherein, based on the comparison that the measured distance is less than the predetermined value, the controller is configured to control the first light source to forgo operation and control the second light source to operate.

10. The light device according to claim 1, further comprising: a third light source comprising at least one third light emitter, the third light source emitting functional light having a different peak wavelength than the light emitted by the multiple first light emitters and the multiple second light emitters.

11. The light device according to claim 10, wherein the functional light is UV light.

12. The light device according to claim 1, wherein the multiple second light emitters are disposed at least between a pair of first light emitters disposed at both ends of the first light source.

13. The light device according to claim 1, wherein the target comprises regions illuminated at different irradiances.

14. The light device according to claim 13, wherein less light is distributed to an outer region of the target than to a central region of the target.

15. A light device comprising:

a first light source comprising multiple first light emitters and multiple second light emitters, wherein the multiple first light emitters and the multiple second light emitters are configured to emit light toward a target;

a distance measurer configured to measure a distance between the first light source and the target; and a controller configured to control operation of the first light source based on a comparison between the distance measured by the distance measurer and a predetermined value, wherein the multiple second light emitters are disposed at least between a pair of first light emitters, wherein each of a plurality of the multiple first light emitters is configured to emit light having a first peak wavelength and each of a plurality of the multiple second light emitters is configured to emit light having a second peak wavelength, wherein the second peak wavelength differs from the first peak wavelength, wherein a distance between a second light emitter of the multiple second light emitters and a first light emitter of the multiple first light emitters located adjacent there to is different from a distance between a pair of adjacent first light emitters of the multiple first light emitters, wherein the multiple first light emitters are operated together and the multiple second light emitters are operated together, wherein, based on the comparison that the measured distance is greater than or equal to the predetermined value, the controller is configured to control the first light source such that the multiple first light emitters are operated, and wherein, based on the comparison that the measured distance is less than the predetermined value, the controller is configured to control the first light source such that the multiple second light emitters are operated.

16. The light device of claim 15, wherein the multiple first light emitters and multiple second light emitters are arranged in a first linear pattern, the light device further comprising a second light source comprising multiple third light emitters arranged in a second linear pattern distinct from the first linear pattern.

17. The light device of claim 15, wherein the target is a plant, the light device further comprising: a second light source comprising another multiple first light emitters arranged at constant intervals, the second light source emitting light for plant cultivation toward the plant.

18. The light device of claim 15, wherein at least one of: the multiple first light emitters or the multiple second light emitters, includes at least one light emitter configured to emit light having a third peak wavelength that differs from a corresponding first peak wavelength or second peak wavelength of the at least one of: the multiple first light emitters or the multiple second light emitters, wherein an intensity of the light having the third peak wavelength is lower than an intensity of the corresponding first peak wavelength or second peak wavelength.

19. A light device comprising:

a first light source comprising multiple first light emitters and multiple second light emitters, wherein the multiple first light emitters and the multiple second light emitters are configured to emit light toward a target, wherein the target is a plant, a second light source comprising another multiple first light emitters arranged at constant intervals, the second light source emitting light for plant cultivation toward the plant, a distance measurer configured to measure a distance between the plant and the first light source, the second light source, or both; and a controller configured to control operation of the first light source and the second light source based on a comparison between the distance measured by the distance measurer and a predetermined value, wherein the multiple second light emitters are disposed at least between a pair of first light emitters, at least one of the multiple first light emitters is disposed between a pair of first light emitters without any intervening second light emitters, the multiple first light emitters are operated together and the multiple second light emitters are operated together, wherein each of a plurality of the multiple first light emitters is configured to emit light having a first peak wavelength and each of a plurality of the multiple second light emitters is configured to emit light having a second peak wavelength, wherein the second peak wavelength differs from the first peak wavelength, wherein at least one of: the multiple first light emitters or the multiple second light emitters, includes at least one light emitter configured to emit light having a third peak wavelength that differs from a corresponding first peak wavelength or second peak wavelength of the at least one of: the multiple first light emitters or the multiple second light emitters, wherein an intensity of the light having the third peak wavelength is lower than an intensity of the corresponding first peak wavelength or second peak wavelength, and wherein a distance between a second light emitter of the multiple second light emitters and a first light emitter of the multiple first light emitters located adjacent there to is different from a distance between a pair of adjacent first light emitters of the multiple first light emitters.

20. The light device according to claim 19, wherein, based on the comparison that the measured distance is greater than or equal to the predetermined value, the controller is configured to control the first light source to operate and control the second light source to forgo operation, wherein, based on the comparison that the measured distance is less than the predetermined value, the controller is configured to control the first light source to forgo operation and control the second light source to operate.

* * * * *